US010596509B2

(12) United States Patent
Melde et al.

(10) Patent No.: US 10,596,509 B2
(45) Date of Patent: Mar. 24, 2020

(54) RING FILTER ELEMENT, IN PARTICULAR FOR OIL SEPARATION OF A CRANKCASE, AND FILTER DEVICE

(71) Applicant: MANN+HUMMEL GMBH, Ludwigsburg (DE)

(72) Inventors: Markus Melde, Speyer (DE); Markus Zuerker, Dudenhofen (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 147 days.

(21) Appl. No.: 15/654,837

(22) Filed: Jul. 20, 2017

(65) Prior Publication Data
US 2018/0021715 A1 Jan. 25, 2018

(30) Foreign Application Priority Data
Jul. 22, 2016 (DE) .................... 10 2016 008 772

(51) Int. Cl.
| | |
|---|---|
| *B01D 29/21* | (2006.01) |
| *B01D 46/24* | (2006.01) |
| *F01M 13/04* | (2006.01) |
| *F04B 17/05* | (2006.01) |
| *B01D 46/00* | (2006.01) |

(52) U.S. Cl.
CPC ....... *B01D 46/0087* (2013.01); *B01D 46/003* (2013.01); *B01D 46/24* (2013.01); *B01D 46/2411* (2013.01); *F01M 13/04* (2013.01); *F01M 2013/0438* (2013.01)

(58) Field of Classification Search
CPC ................ B01D 29/21; B01D 46/0031; B01D 46/0087; B01D 46/2414; B01D 2279/30; B01D 46/2411; B01D 46/003; B01D 46/24; F01M 13/04; F01M 2013/0438; F04B 17/05
USPC ........... 55/310, 314, 492, 502; 210/232, 234
See application file for complete search history.

(56) References Cited

U.S. PATENT DOCUMENTS

| | | | | |
|---|---|---|---|---|
| 3,231,089 A | * | 1/1966 | Thornton ............... | B01D 27/08 137/512.4 |
| 8,794,222 B2 | * | 8/2014 | Schwandt ............. | F01M 13/04 123/573 |
| 2004/0112348 A1 | * | 6/2004 | Dworatzek ........ | B01D 46/0087 123/572 |

(Continued)

FOREIGN PATENT DOCUMENTS

| | | |
|---|---|---|
| DE | 102007062098 A1 | 7/2013 |
| DE | 102013005624 A1 | 10/2013 |
| GB | 1526893 A | 10/1978 |

*Primary Examiner* — Minh Chau T Pham
(74) *Attorney, Agent, or Firm* — James Hasselbeck

(57) ABSTRACT

A ring filter element has a filter medium body flowed through radially form an interior of the filter medium body to an exterior of the filter medium body. A bypass valve is provided that is adjustable between a blocking position, separating a raw side at the interior of the filter medium body from a clean side at the exterior of the filter medium body, and an open position, connecting the raw side of the filter medium body with the clean side of the filter medium body. The bypass valve is arranged in an axial direction of the filter medium body at least partially external to a first axial end face of the filter medium body and extends radially at most up to the clean side of the filter medium body. The ring filter element is employed in a filter device of a crankcase.

14 Claims, 2 Drawing Sheets

(56) References Cited

U.S. PATENT DOCUMENTS

| | | | |
|---|---|---|---|
| 2006/0053756 A1* | 3/2006 | Hawkins | B01D 29/21 55/310 |
| 2010/0307466 A1 | 12/2010 | Ruppel et al. | |
| 2014/0352271 A1* | 12/2014 | Jacob | B01D 46/0031 55/492 |
| 2014/0366494 A1* | 12/2014 | Ardes | B01D 29/21 55/314 |
| 2015/0338142 A1* | 11/2015 | Price | F04B 17/05 62/468 |
| 2016/0220931 A1* | 8/2016 | Ardes | B01D 35/147 |

* cited by examiner

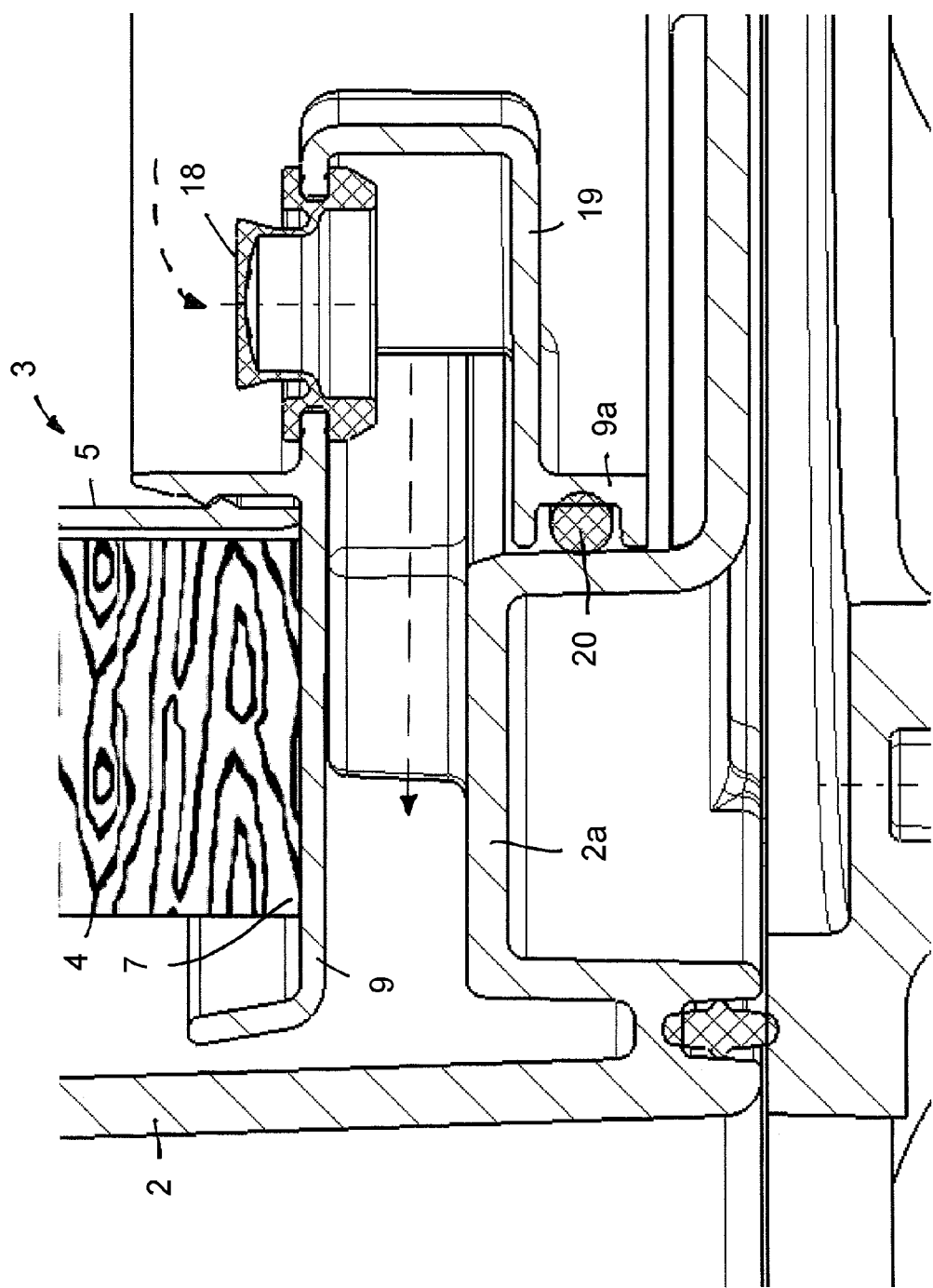

RING FILTER ELEMENT, IN PARTICULAR FOR OIL SEPARATION OF A CRANKCASE, AND FILTER DEVICE

TECHNICAL FIELD

The invention concerns a ring filter element, in particular for separation of liquid, in particular oil separation, from a gas stream, in particular from a blow-by gas stream of a crankcase, that comprises a bypass valve that is adjustable between a blocking position separating the raw side from the clean side and an open position connecting the raw side with the clean side. The invention concerns also a filter device comprising such a ring filter element.

BACKGROUND OF THE INVENTION

DE 10 2013 005 624 A1 discloses a hollow cylindrical ring filter element in a filter device that is employed for separation of oil droplets from an oil-containing air stream originating from the crankcase of an internal combustion engine. The ring filter element is flowed through radially from the exterior to the interior wherein, adjacent to the externally positioned inflow side of the filter element, a pressure-relief valve is arranged that opens automatically for discharge and bypassing the filter element when the pressure of the air stream at the inflow side surpasses a threshold value. When the pressure-relief valve is open, the unpurified air stream is discharged into the environment.

SUMMARY OF THE INVENTION

The invention has the object to design a ring filter element furnished with a bypass valve with simple constructive measures so as to be compact.

This object is solved according to the invention by a ring filter element, in particular for oil separation of a crankcase, with a filter medium body that can be flowed through radially from the interior to the exterior and with a bypass valve connected to the ring filter element that is adjustable between a blocking position separating the raw side from the clean side and an open position connecting the raw side with the clean side, wherein the bypass valve is arranged axially at least partially external to a first end face of the filter medium body and extends radially at most up to the externally positioned clean side of the filter medium body.

The dependent claims provide expedient further embodiments.

The ring filter element according to the invention is preferably embodied hollow cylindrical and is flowed through in radial direction by the fluid to be purified, in particular a gas stream, preferably an oil-containing air stream. The ring filter element comprises a filter medium body of a filter material where the filtration is taking place. The ring filter element is flowed through in radial direction from the interior to the exterior by the fluid to be purified so that the inner side is the raw side and the outer side is the clean side of the filter element and of the filter medium body.

The ring filter element is provided with a bypass valve that is adjustable between a blocking position and an open position wherein in the blocking position the raw side is separated from the clean side and in the open position a flow connection between the raw side and the clean side is produced by means of the bypass valve. The bypass valve is arranged axially in the area of or at a first end face of the filter medium body and is located at least partially external to the end face of the filter medium body. In radial direction relative to the longitudinal axis of the ring filter element, the bypass valve extends maximally up to the externally positioned clean side of the filter medium body. In this context, the first end face is preferably an end face that can be centrally flowed through and comprises further preferred an open end disk. Further preferred, the second oppositely positioned end face preferably comprises a closed end face.

The bypass valve is connected with the ring filter element so that the ring filter element and the bypass valve form an integral component. Due to the position of the bypass valve at the end face of the filter medium body, a compact configuration is provided in particular in radial direction. Since the bypass valve is located axially at least partially external to and at a spacing to the end face of the filter medium body and accordingly does not project or only minimally project into the internally positioned flow space in the ring filter element, the flow conditions in the internally positioned flow space upon inflow at the raw side of the filter medium body is not negatively affected by the bypass valve. It is further advantageous that the bypass valve can be mounted easily due to being arranged on the ring filter element so as to be easily accessible from the exterior for servicing purposes.

In radial direction, the bypass valve extends no farther than up to the externally positioned clean side of the filter medium body. According to an advantageous embodiment, the bypass valve is positioned in such a way that in radial direction it does not extend farther than up to the internally positioned raw side of the filter medium body. In this embodiment, the bypass valve, viewed in radial direction, is located within an envelope that is laid about the internally positioned raw side of the filter medium body and is axially extended. In axial direction, it can be expedient when the bypass valve is arranged completely external to the internally positioned flow space and thus external to the axial end face of the filter medium body.

According to a further expedient embodiment, the bypass valve is integrated into an end disk which is located at the end face of the filter medium body and flow-tightly closes off the end face. The end disk can comprise a central opening or cutout by means of which the raw fluid can be guided axially into the internally positioned flow space. The opening forms the axial inflow side of the filter medium body where advantageously the bypass valve is located. In an alternative embodiment, it is also possible that the bypass valve is located at the end face of the ring filter element that is opposite the axial inflow side, in particular integrated into an otherwise closed end disk.

According to a further expedient embodiment, a wall of the bypass channel which adjoins the bypass valve is formed by the end disk that covers an end face of the filter medium body. The bypass channel is preferably guided immediately along the axial end face of the filter medium body and extends in particular in radial direction. The bypass channel, if necessary, can be arranged as a one-piece channel on the end disk, for example, attached thereto, or can be formed together with the end disk as one piece. The bypass channel is preferably embodied to be closed at the end region which is facing the internally positioned flow space in the ring filter element and which supports the bypass valve in this end region. The oppositely positioned radial outwardly oriented side of the bypass channel, on the other hand, is preferably designed to be open so that fluid that passes through the bypass valve into the bypass channel is guided radially from the raw side to the clean side by bypassing the filter medium body and can exit at the open side of the bypass channel.

According to a further advantageous embodiment, the bypass valve is held on the bypass channel and is arranged on the side of the bypass channel which is facing the filter medium body.

According to a further expedient embodiment, the bypass channel bridges in radial direction the filter medium body so that the oppositely positioned ends of the bypass channel are located radially inside and radially outside of the filter medium body.

According to a further expedient embodiment, the bypass valve and/or the bypass channel is arranged axially between the end face of the filter medium body and a sealing ring which is located at a greater axial spacing relative to the end face of the filter medium body than the bypass valve. The sealing ring is in particular arranged on an axially extended in particular tubular section of the end disk and separates the raw side from the clean side. Such a preferably tubular section can have a diameter that corresponds approximately to the diameter of an envelope which is laid about the internally positioned raw side of the filter medium body and is axially extended. In any case, it is preferred when the section has a diameter that is identical or smaller than the envelope of the externally positioned clean side of the filter medium body.

The bypass valve, if necessary, can project axially partially into the internally positioned flow space in the filter element. It can be advantageous when the bypass channel as well as the carrier section which is the carrier of the sealing ring are formed together with the end disk as one piece, wherein the carrier section of the sealing ring is preferably embodied cylindrical and may comprise a radial outwardly open receiving groove for receiving the sealing ring.

The invention concerns moreover a filter device with a filter housing for receiving the filter element, wherein the wall of the filter housing, if necessary, can form a wall of the bypass channel. The bypass channel is advantageously delimited, on the one hand, by the end disk and, on the other hand, by the component of the filter housing. The sealing ring for separation of the raw side and clean side is contacting preferably an extended carrier section of the end disk and pushes against the component of the filter housing that also forms a wall of the bypass channel.

The filter device is preferably used for separation of the oil/air mixture from the crankcase of an internal combustion engine. In this context, preferably oil, in particular in the form of oil droplets or oil mist, is separated from the crankcase gas stream (blow-by gas stream). In this case, the filter device preferably does not serve as a filter device in the narrower sense which, upon flow through the filter medium, separates particles wherein the latter are then deposited or absorbed in the filter medium, but instead as a separating device, in particular as a coalescing separator, in which the liquid present in the form of liquid droplets, mist or aerosol is retained in the filter medium or separating medium, combined to larger droplets, and then discharged from the separating medium preferably to a drainage opening.

BRIEF DESCRIPTION OF THE DRAWINGS

Further advantages and expedient embodiments are disclosed in the further claims, the figure description, and the drawings.

FIG. 2 shows a detail illustration of the area with the bypass valve.

In the Figures, same components are provided with same reference characters.

DESCRIPTION OF PREFERRED EMBODIMENTS

Figure 1:
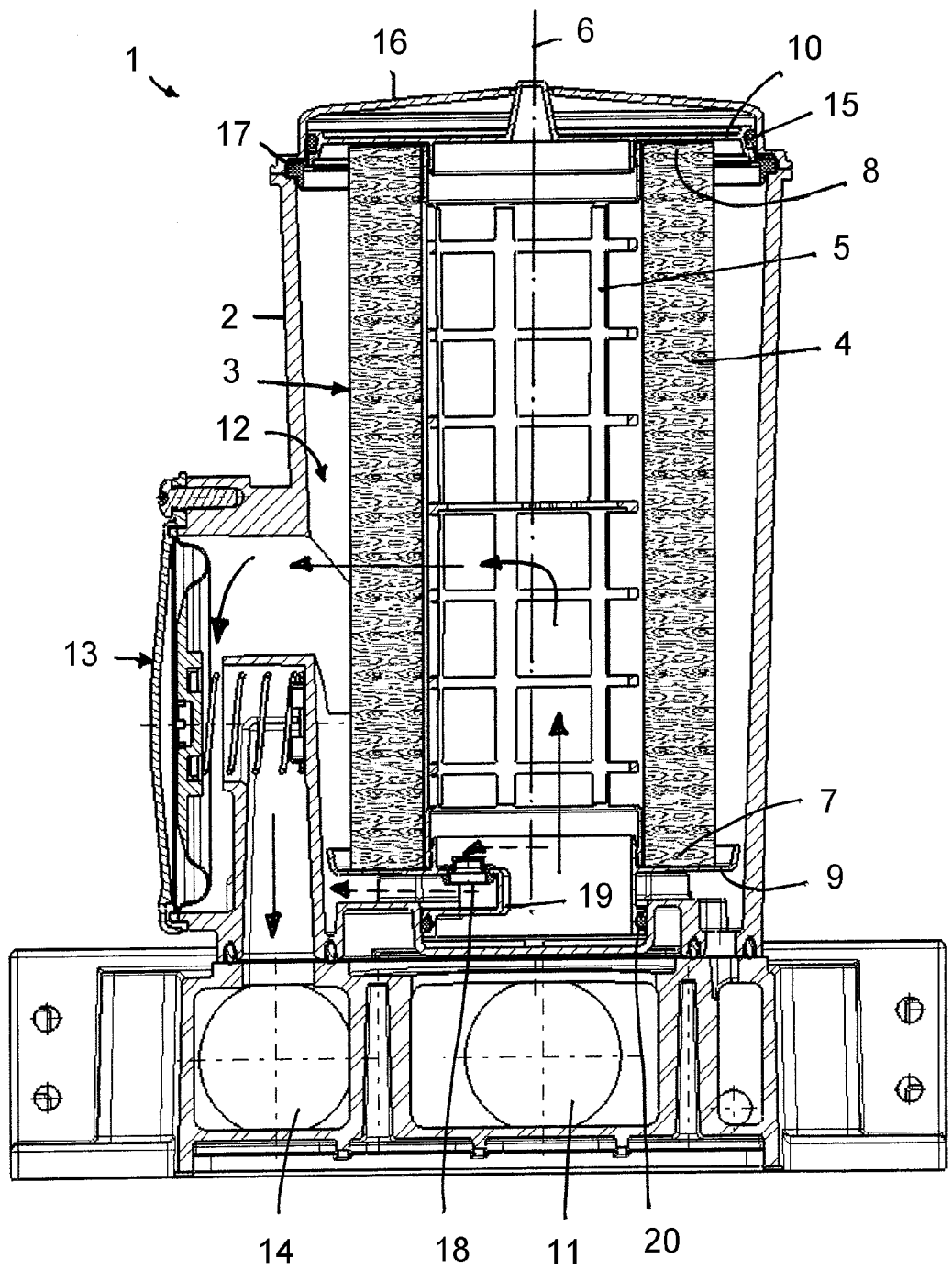
FIG. 1 shows a section lengthwise through a filter device with a hollow cylindrical ring filter element having a bypass valve at its one end face.

The filter device 1, shown in section in FIG. 1, is employed, for example, for separating oil droplets from an air stream which may be the crankcase gases from a crankcase of an internal combustion engine. The filter device 1 comprises a filter housing 2 in which a ring filter element 3 is inserted. The ring filter element 3 is of a hollow cylindrical configuration and comprises a filter medium body 4 of a filter medium that is flowed through by the fluid to be purified, as illustrated by the solid arrows, in radial direction from the interior to the exterior.

The internally positioned flow space in the hollow cylindrical filter medium body 4 forms thus the raw space, the internally positioned wall surface the raw side of the filter medium body, and the externally positioned wall surface the clean side of the filter medium body. The internally positioned flow space is lined by a support grid 5 of a plastic material.

The ring filter element 3 comprises the longitudinal axis 6 relative to which the filter medium body 4 in radial direction is flowed through from the interior to the exterior. The end faces 7 and 8 of the filter medium body 4 are flow-tightly covered by an end disk 9 or 10, respectively, wherein the lower end disk 9 in FIG. 1 is embodied open and preferably comprises a central opening through which the unpurified raw fluid can be supplied from an inflow space 11 in the filter housing 2. The top end disk 10 is embodied in contrast thereto continuous, i.e., closed, so that the internally positioned flow space in the filter medium body 4 is closed off flow-tightly in upward direction.

After having flowed through the filter medium body 4, the purified fluid is located in an annular collecting chamber 12 that is delimited radially inwardly by the outer wall surface of the filter medium body 4 and radially outwardly by the filter housing 2. The purified fluid, as indicated by the arrows, can flow out from the annular collecting chamber 12 through a pressure control valve 13 axially in downward direction in the direction toward an outflow chamber 14 in the filter housing 2.

The upper end disk 10 is preferably flow-tightly sealed by a sealing element 15 relative to a housing cover 16. The housing cover 16 is flow-tightly connected with at least one sealing element 17 to the filter housing 2. The sealing elements 15 and 17 are preferably embodied as disclosed in DE 10 2016 005 358.

As can be seen in FIG. 1 in connection with FIG. 2, a bypass arrangement with a bypass valve 18 and a bypass channel 19 is arranged in the area of the inflow side neighboring the lower end face 7 of the filter medium body 4. The bypass valve 18 is located axially at the level of the end face 7 and projects preferably partially axially into the internally positioned flow space that is delimited by the filter medium body 4, wherein a further portion of the bypass valve 18 is preferably arranged axially external to the internally positioned flow space, i.e., external to the axial extension of the filter medium body 4. Viewed in radial direction, the bypass valve 18 is positioned with radial spacing to the inwardly positioned wall surface—the raw side—of the filter medium body 4.

The bypass valve 18 is arranged at the end disk 9 and is mounted in a cutout which is provided in a section of the end disk 9 projecting radially inwardly and which preferably forms at least partially the bypass channel 19. The bypass valve 18 is positioned for regular flow conditions—as long as the differential pressure between raw side and clean side has not surpassed a threshold value—in a blocking position in which an immediate transfer flow from the raw side to the clean side is prevented. Upon surpassing the pressure threshold value, the bypass valve 18 reaches an open position in which the unpurified fluid passes from the raw side directly via the bypass channel 19 to the clean side in accordance with the dashed arrow in FIG. 2.

The bypass channel 19 extends in radial direction and extends along the end face 7 of the filter medium body 4. The walls of the bypass channel 19 are formed, on the one hand, by the end disk 9 and, on the other hand, by a housing section 2a of the filter housing 2. The bypass valve 18 is located preferably axially at the level of the end disk section which is immediately positioned on the end face 7 of the filter medium body 4. The opening of the bypass valve 18 is preferably facing the internally positioned flow space in the filter medium body 4.

In radial direction, the bypass channel 19 extends along the wall of the filter medium body 4 and projects radially inwardly at a spacing to the raw side of the filter medium body 4 as well as radially outwardly also at a spacing to the clean side of the filter medium body 4. The radial internally positioned end section of the bypass channel 19 is of a closed configuration and is formed by the end disk 9. The radial outwardly positioned end region of the bypass channel 19 is of an open configuration and, as already described, is formed, on the one hand, by the end disk 9 and, on the other hand, by the housing section 2a of the filter housing 2. It is thus apparent that the end disk 9 preferably comprises a bypass channel or a bypass channel section.

The radial internally positioned end region of the end disk 9 is adjoined by a carrier section 9a, which is formed together with the end disk 9 as one piece and comprises a radial outwardly open receiving groove with a sealing ring 20 inserted therein which is sealingly contacting a sidewall of the housing section 2a in radial direction. In axial direction, the sealing ring 20 is spaced apart from the end disk 9 as well as from the bypass valve 18. By means of the sealing ring 20, a flow-tight connection between the end disk 9 and the filter housing 2 is ensured. As can be seen in FIGS. 1 and 2, the section of the bypass channel 19 which is formed in the end disk 9 and the radial seal that is provided by the sealing ring 20 are preferably arranged on a tubular section which is formed preferably together with the end disk 9 as one piece and is extending, in particular as an extension of the internally positioned flow space, away from the filter medium body 4. The tubular section has preferably a diameter which corresponds approximately to the diameter of the support grid 5 or, more generally, of an envelope which is laid about the internally positioned raw side of the filter medium body 4 and is axially extended.

While specific embodiments of the invention have been shown and described in detail to illustrate the inventive principles, it will be understood that the invention may be embodied otherwise without departing from such principles.

What is claimed is:
1. A ring filter element comprising:
a filter medium body configured to be flowed through in a radial direction of the filter medium body from a raw side at an interior of the filter medium body to a clean side at an exterior of the filter medium body;
an end disk arranged on a first axial end face of the filter medium body, the end disk having:
a sealing ring disposed on the end disk;
a radially inward extending hollow tubular bypass channel formed in the end disk and formed in one piece with the end disk, the hollow tubular bypass channel of the end disk projecting radially inwardly into the interior of the filter medium body;
wherein the hollow tubular bypass channel of the end disk is arranged axially between the filter medium body and the sealing ring of the end disk;
a bypass valve arranged on a radially inner end of the hollow tubular bypass channel in the interior of the filter medium body, the bypass valve configured to be adjustable between a blocking position, separating the raw side of the filter medium body at the interior of the filter medium body from the clean side of the filter medium body at the exterior of the filter medium body, and an open position connecting the raw side of the filter medium body with the clean side of the filter medium body.

2. The ring filter element according to claim 1, wherein the hollow tubular bypass channel extends immediately along the first axial end face of the filter medium body.

3. The ring filter element according to claim 2, wherein the hollow tubular bypass channel extends in the radial direction of the filter medium body and bridges radially the first axial end face of the filter medium body.

4. The ring filter element according to claim 1, wherein the bypass valve is integrated into the end disk.

5. The ring filter element according to claim 4, wherein the end disk comprises an opening.

6. The ring filter element according to claim 4, wherein the end disk forms a wall of the bypass channel at the first axial end face of the filter medium body.

7. The ring filter element according to claim 4, wherein the sealing ring is disposed on an extended section of the end disk.

8. The ring filter element according to claim 1, wherein the bypass valve is arranged on an axial inflow side of the filter medium body.

9. The ring filter element according to claim 1, wherein the first axial end face is configured to be flowed through centrally.

10. The ring filter element according to claim 9, wherein the end disk is an open end disk having a central opening.

11. The ring filter element according to claim 10, further comprising
a closed end disk arranged at a second axial end face opposite the first axial end face.

12. A filter device comprising:
a ring filter element comprising:
a filter medium body configured to be flowed through in a radial direction of the filter medium body from a raw side at an interior of the filter medium body to a clean side at an exterior of the filter medium body;
an end disk arranged on a first axial end face of the filter medium body, the end disk having:
a sealing ring disposed on the end disk;
a hollow tubular bypass channel formed in the end disk and formed in one piece with the end disk, the hollow tubular bypass channel of the end disk projecting radially inwardly into the interior of the filter medium body;
wherein the hollow tubular bypass channel of the end disk is arranged axially between the filter medium body and the sealing ring of the end disk;

a bypass valve arranged on a radially inner end of the hollow tubular bypass channel in the interior of the filter medium body, the bypass valve configured to be adjustable between a blocking position, separating the raw side of the filter medium body at the interior of the filter medium body from the clean side of the filter medium body at the exterior of the filter medium body, and an open position, connecting the raw side of the filter medium body with the clean side of the filter medium body a filter housing configured to accommodate the ring filter element.

13. A crankcase comprising a filter device according to claim 12.

14. The filter device according to claim 12, wherein the radially inwardly extending hollow tubular bypass channel has a bypass valve opening, opening from the interior flow space into an interior of the hollow tubular bypass channel of the end disk, wherein the bypass valve is arranged at the interior flow space, in the bypass valve opening.

* * * * *